United States Patent [19]
Battu et al.

[11] Patent Number: 5,808,838
[45] Date of Patent: Sep. 15, 1998

[54] MINIATURE HEAD DISC DRIVE SYSTEM VOICE COIL WITH SINGLE COIL AND DUAL STATIONARY MAGNETS

[75] Inventors: Ramgopal Battu, Los Angeles County; Iraj Jabbari, Santa Clara County; Sanjoy Ghose, Santa Cruz County, all of Calif.

[73] Assignee: Seagate Technologies, Inc., Scotts Valley, Calif.

[21] Appl. No.: 484,682

[22] Filed: Jun. 7, 1995

Related U.S. Application Data

[62] Division of Ser. No. 181,888, Jan. 14, 1994, abandoned, which is a continuation of Ser. No. 56,984, May 3, 1993, abandoned, which is a continuation of Ser. No. 932,922, Aug. 20, 1992, abandoned, which is a continuation of Ser. No. 807,793, Dec. 12, 1991, abandoned, which is a continuation of Ser. No. 477,747, Feb. 9, 1990, abandoned.

[51] Int. Cl.[6] .................................................. G11B 5/54
[52] U.S. Cl. ........................................ 360/106; 360/97.01
[58] Field of Search ............................. 360/97.01, 97.02, 360/98.01, 105, 106

[56] References Cited

U.S. PATENT DOCUMENTS

| | | | |
|---|---|---|---|
| 4,609,949 | 9/1986 | Kutaragi | 360/27 X |
| 4,689,700 | 8/1987 | Miyake et al. | 360/78.04 |
| 4,875,117 | 10/1989 | Slezak et al. | 360/98.01 |
| 4,881,139 | 11/1989 | Hazerbouck | 360/106 |
| 4,941,062 | 7/1990 | Yoshioka | 360/106 |
| 4,956,733 | 9/1990 | Dalzid et al. | 360/98.01 X |
| 4,965,684 | 10/1990 | Stefansky | 360/97.01 X |
| 4,965,691 | 10/1990 | Iftikar et al. | 360/106 X |
| 4,985,793 | 1/1991 | Anderson | 360/105 |
| 5,025,335 | 6/1991 | Stefansky | 360/97.01 |
| 5,025,336 | 6/1991 | Morehouse et al. | 360/97.01 X |
| 5,034,837 | 7/1991 | Schmitz | 360/106 |

OTHER PUBLICATIONS

PC Week vol. 6, No. 44; Kristina Sullivan; "Prairie Tek Planning 2.5 inch Hard Drive for Notebook PC", Nov. 6, 1989.

*Primary Examiner*—Jefferson Evans
*Attorney, Agent, or Firm*—Flehr Hohbach Test Albritton & Herbert LLP; James A. Sheridan; R. Michael Ananian

[57] ABSTRACT

A disc drive system having at least one hard disc having concentric tracks is supported by a hub positioned in a centrally located aperture. The disc is rotated at a constant speed by a DC motor attached to the hub. A transducer head for communicating information with the hard disc is moved relative to the disc surface by a positioning apparatus. The positioning apparatus includes a voice coil motor for selectably and accurately positioning the transducer head over the tracks on the hard disc. The disc drive system is enclosed in a housing having a base portion and a roof portion. The positioning apparatus includes a shaft about which the transducer head rotates to move the transducer from track to track. In one configuration, permanent magnets are attached to the base and roof, and a moving coil is interposed between them, the housing completing a magnetic circuit in the VCM. In one aspect the disc drive system is designed to be permanently mounted in a portable, lap-top or notebook computer. Alternatively, it is adaptable for insertion and removal from a connector port in the computer.

16 Claims, 2 Drawing Sheets

MINIATURE HEAD DISC DRIVE SYSTEM VOICE COIL WITH SINGLE COIL AND DUAL STATIONARY MAGNETS

RELATED APPLICATIONS

The application Ser. No. 08/484,682 filed Jun. 7, 1995 is a division of application Ser. No. 08/181,888 filed 14 Jan. 1994, now abandoned. Applications related to this application as a continuation, continuation-in-part, and/or divisional application through the common parent application Ser. No. 07/477,747 are as follows: application Ser. No. 08/486,932 is a divisional of 08/430,309 filed Apr. 28, 1995 (now abandoned); which is a continuation of 07/893,641 filed Jun. 5, 1992 (now abandoned); which is continuation-in-part of 07/477,747 filed Feb. 9, 1990 (now abandoned). Application Ser. No. 08/486,934 is a divisional of 08/430, 309 filed Apr. 28, 1995 (now abandoned); which is a continuation of 07/893,641 filed Jun. 5, 1992 (now abandoned); which is continuation-in-part of 07/477,747 filed Feb. 9, 1990 (now abandoned). Application Ser. No. 08/581,760 is a continuation of 08/430,309 filed Apr. 28, 1995 (now abandoned); which is a continuation of 07/893, 641 filed Jun. 5, 1992 (now abandoned); which is continuation-in-part of 07/477,747 filed Feb. 9, 1990 (now abandoned). Application Ser. No. 08/181,888 filed Jan. 14, 1994 is a continuation of 08/056,984 filed May 3, 1993 (now abandoned); which is a continuation of 07/932,922 filed Aug. 20, 1992 (now abandoned); which is a continuation of 07/807,793 filed Dec. 12, 1991 (now abandoned); which is a continuation of 07/477,747 filed Feb. 9, 1990 (now abandoned).

FIELD OF THE INVENTION

The present invention is directed generally to the field of hard disc drives, and more particularly to miniature Winchester-type hard disc drive systems.

BACKGROUND OF THE INVENTION

With the rapidly expanding development of personal computers into the field of the first what were termed portable, then lap-top, and now notebook size computers, there has been a tremendous demand for maintaining the performance of the disc drive systems of such computers. The major development in this direction has been the development of smaller Winchester-type disc drives as replacements and enhancements to floppy disc drives for program storage. The Winchester disc drive, in general, provides higher capacities and faster speeds of operation, factors which are of great importance for the effective use of personal computers running advanced software packages.

The Winchester-type disc drives that have been developed for the personal computer market were initially based on the use of hard discs of a diameter of approximately 5.25 inches. Many of these disc drives used stepper motors for positioning a transducer over a selected track on the rotating disc, although larger capacity systems typically used voice coil motors. The next step in reduction of size of the disc drive was to cut the "form factor" (the dimensions of the external case for the complete disc drive) by one half, so that the resulting disc drive used a platter of 3.5 inch diameter. The height of the disc drive was also becoming a significant factor, and efforts were made to reduce the height of the disc drive as well, so that the size of the casing for the personal computer could be minimized. However, as to most lap-top and notebook computers, hard disc drives continue to be external devices.

SUMMARY OF THE INVENTION

It is an objective of the present invention to provide a compact hard disc drive system having reduced length, width and height dimensions.

Another object of the invention is to provide a compact hard disc drive system which may be inserted and removed from the computer, both to maximize the effectiveness of the disc drive and provide additional storage capacity by interchanging disc drives, as well as to provide for security for the information stored on the disc drive.

A further objective of the present invention is to provide a disc drive which is compatible with the reduced power budget available in a battery-operated portable computer. Typically, portable computers only provide 5V DC, which must be capable of providing sufficient power both to maintain the disc spinning at a constant speed, and powering the motor of the head arm actuator to selectively position the head over a track on the disc and maintain the head position over the target track on the disc.

Another object of the present invention is to utilize a voice coil motor design which is extremely compact yet capable of reliable positioning of the transducer supporting actuator arm relative to the disc on a long-term basis.

Yet another objective of the invention is to provide quick connect/interconnect capability on the outer portions of the head disc assembly to provide a simply-connected interface to the drive control electronics.

The compact Winchester-type disc drive of the present invention was specifically designed to provide a system which will meet the demands of notebook and lap-top size and type computer systems. In a preferred embodiment, the rotating disc dimensions will be 15 mm inside diameter to 45 mm outside diameter.

In the preferred embodiment of the present invention, two hard discs will be provided, although a single hard disc design may also be used. Storage on each disc in excess of 5 megabytes once the discs are formatted is provided. An actuator system supports two read/write heads for each disc, one head positioned on each side of the disc, to write digital information on and read digital information from the disc. A positioning mechanism is provided to move the transducer between the tracks on the discs and for holding the transducer accurately positioned over each track to write information on and read information from the disc.

In a preferred embodiment of the present invention, the actuator includes a rotary voice coil motor, which is arranged to move the transducer along a path extending in an approximately radial direction with respect to the hard disc to move the transducer selectively to any track between the inner diameter of 15 mm and the outer diameter of 45 mm.

Means will be provided for lifting the heads from the disc, comprising either a shape memory metal withdrawal system or a ramp system combined with ahead rest area adjacent the outer diameter of the disc in order to provide a very high resistance to non-operating shocks.

By incorporating the features generally outlined above and to be described in further detailed below, a disc drive having an overall outer dimension of about 70 mm by about 50 mm, with a thickness of 10 mm, can be achieved, wherein the disc inner diameter is 15 mm and outer diameter is 45 mm. In this way, a highly compact, easily inserted and removed disc drive is achieved.

DETAILED DESCRIPTION OF A PREFERRED EMBODIMENT

Figure 1:
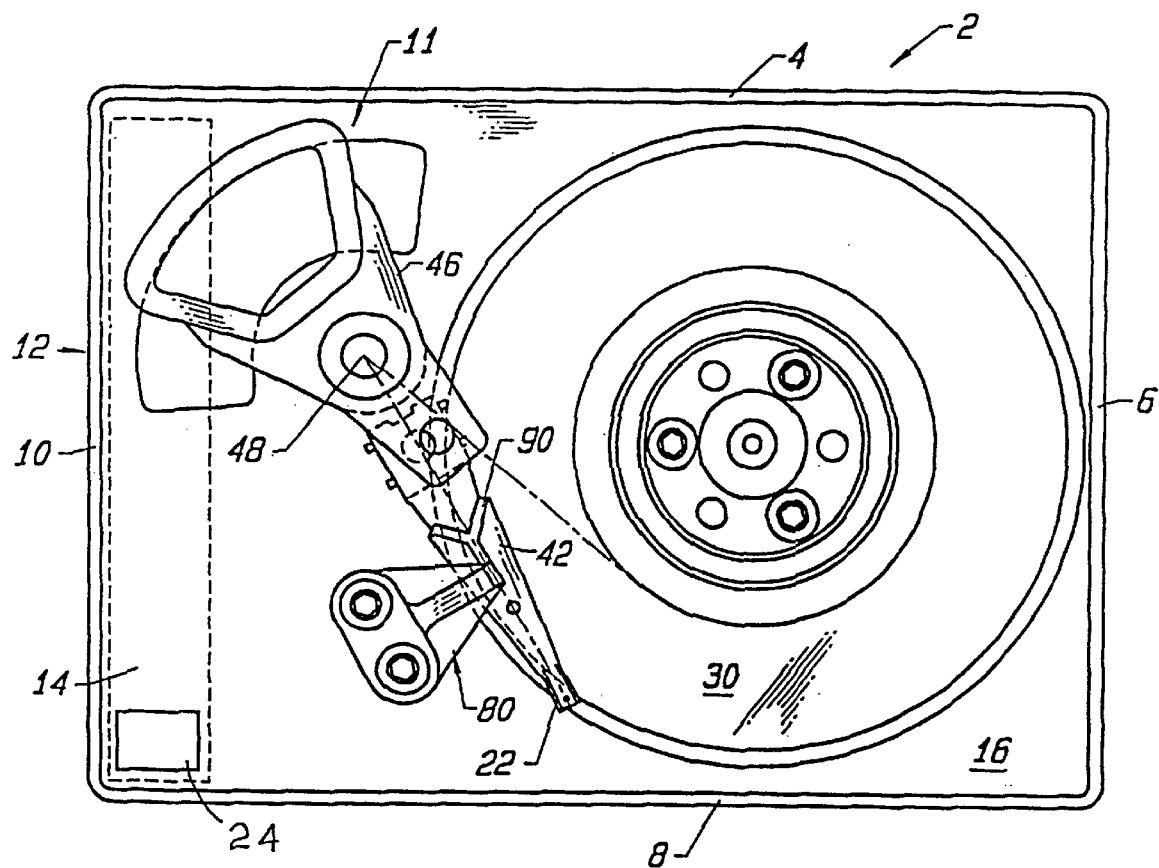
FIG. 1 is a top plan view of the disc drive of this invention.

The compact Winchester disc drive of the present invention is shown in a top plan view (with the cover removed) in FIG. 1 and in a vertical sectional view in FIG. 2. In this figure and in FIG. 2, like components are designated by like reference numerals.

Referring first to FIG. 1, the major elements of the compact disc drive of the present invention are shown, including a housing 2 which includes upright walls 4, 6, 8, and 10. It is anticipated that the housing may be slid into a slot provided within the computer for the disc drive system. In order to minimize the electronics which must be provided on this very small disc drive, an external connector generally indicated at 12 is provided on the housing wall to the rear of motor 11. A second connector may be provided on the bottom surface 16 of the disc drive to provide additional electrical connections from the disc drive to the electronics which are in turn supported within the computer.

By providing the electrical connectors 12, 14 immediately adjacent the voice coil motor 11 and the leads which run back from the transducer 22, the length of the runs of the wires is minimized. This is important especially with respect to the wire length from the external interconnect 12, 14 to the transducer 22 because the signals picked up from the transducer 22 are relatively weak. In order to amplify these signals, an internal preamplifier (not shown) may be provided mounted on the baseplate 16 of the housing 2. In this way, the signals picked up from the transducer receive sufficient amplification to be accurately replicated after being transferred over the connecting interfaces 12, 14 to the electronics incorporated in the disc drive.

The drive is mounted in a hard case without external shock mounts. It is anticipated that to accommodate the minimal size of the disc drive, an appropriate mount can be incorporated into the lap-top or notebook size computer with which this disc drive is especially intended to work.

The disc drive system designed in accordance with the preferred embodiment of this invention is a microprocessor-based device which moves the transducer 22 from track to track across the surface of the disc 30 in response to commands received by the microprocessor from the host system on the computer by way of a disc drive controller. The disc drive controller and microprocessor of the present invention are not shown herein, and would be mounted externally to the disc drive and connected by the interface 12 or 14 to the disc drive in order to minimize the parts count supported on the disc drive. Alternatively, certain critical electronic elements of the present invention may be supported from the base 16 of the disc drive internally or externally, provided appropriate shock damping and thermal isolation is utilized.

Figure 2A:
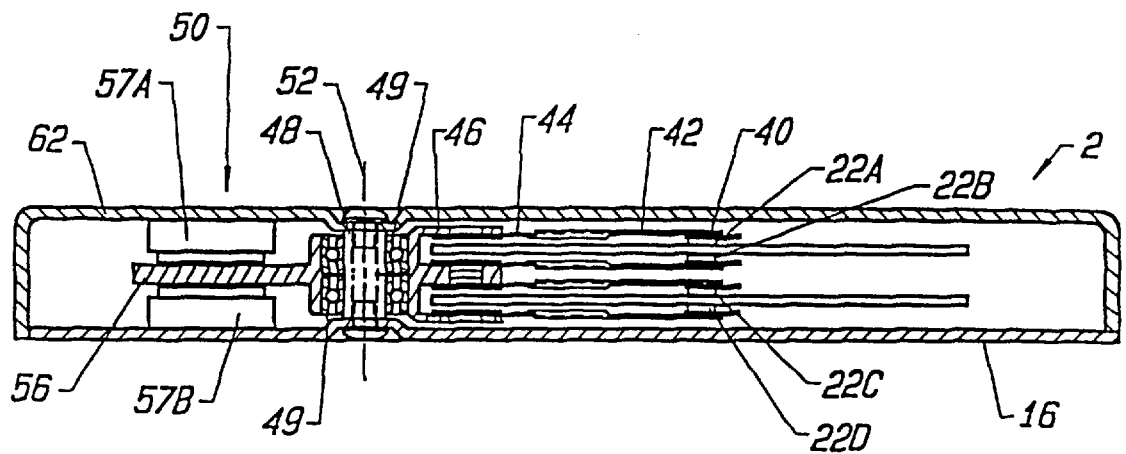
FIGS. 2A and 2B are sectional views of the disc drive of FIG. 1.
Figure 2B:
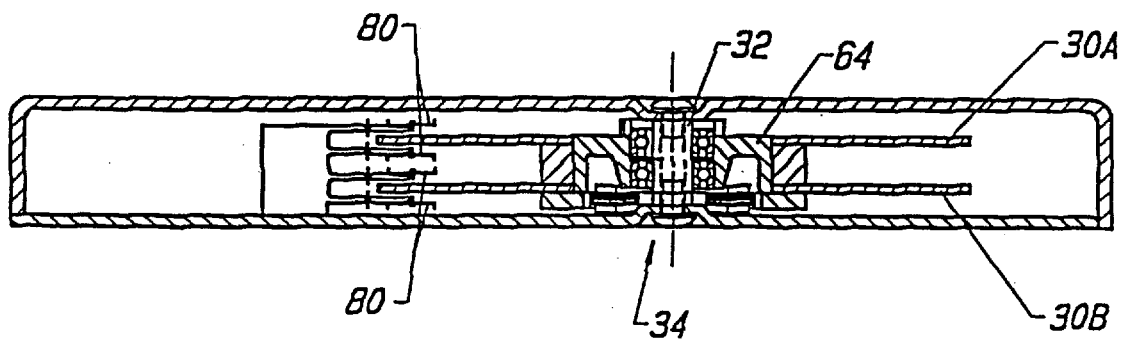

Turning to FIG. 2A, each disc 30A, 30B is mounted within the housing and on the hub of a spindle 32 supported on a spindle motor 34. Each of the discs has an inner diameter of about 15 mm and an outer diameter of about 45 mm, and is from 0.020 inch to 0.025 inch thick. In a preferred embodiment as shown in FIGS. 2A, 2B, 2C, two discs 30 are supported on the spindle 32, and transducers 22A, B, C, D are provided for reading and writing on both surfaces of each disc. The transducers 22 in a preferred embodiment comprise MR heads of the type made by PCI Components, Inc. of Minneapolis, Minn.

Each read/write head 22 is mounted on a gimble 40 mounted at one end of a flexture 42, the gimble supporting a 70 percent of normal length slider/gimble/suspension and a 50 to 70 percent of normal length flexture 42.

The supported end 44 of each flexture 42 is fastened to arm 46 which is rotated about pivot 48 by voice coil motor 50. The flexure and arm are arranged to provide a straight arm extending from the voice coil motor out to the disc in accordance with the teachings of the Gitzendammer U.S. Pat. No. 4,620,251, assigned to the assignee of the present invention. The supporting arm 46 is supported at pivot 48 on a steel shaft fixed to the races of a pair of ball bearings 49 which are in turn located in the base 16 of the housing 2. The shaft 48 rotates about the axis 52 to quickly and reliably alter the position of the transducers 22A–D relative to the tracks on the disc.

The voice coil motor 50 in a preferred embodiment comprises a single moving magnet 56 supported on the distal end of the arm 46 from the flexure 42. The single moving magnet motor 50 which comprises in a preferred embodiment a moving magnet and backarm which serves as a balancing counterweight is movable between two coils 57A, B supported above and below the magnet 50. Alternatively, a coil may be supported on the distal end of the arm 46, movable with selective activation of upper and lower magnets. In this instance, one of the magnets may be supported from the base casting 16 of the housing, with the other magnet being supported from the upper portion 62 (FIG. 2) of the housing.

Referring next to FIG. 2B, the voice coil motor 34 is clearly shown being an in-hub spindle motor which supports the disc on the outer rotating hub 64. To minimize the height of the motor, Hall-less driving circuits of the type disclosed in the patent application of A. Cassat, U.S. Pat. No. 5,001, 401, issued March 1991 are incorporated in the motor to determine its position and appropriately drive it in the correction direction.

Referring to both FIG. 1 and FIG. 2B, it is important to note that in order to maximize the ability of the system to handle shocks of up to 100 to 150 g's for portable applications, the system is designed to provide for landing the head gimble array on a separate area or ramp 80 adjacent the rotating disc, rather than allowing the head to rest on the disc as in most known smaller disc drives. One approach to achieving this goal is to use a shape memory metal head gimble assembly head lifting wire of the type disclosed in U.S. Pat. No. 4,996,617, issued 26 Feb. 1991 (incorporated herein by reference), assigned to the assignee of this invention, wherein a wire would extend down the centerline of the flexure 42 and be attached to a point on the flexure, the wire being shortened in length in response to application of a current to cause the bending of the flexure 42 and to lift the flexure up off the rotating disc surface. Alternatively, an inclined ramp 81 may be utilized cooperating with the flexure 42 and a cam member incorporated as a ridge 90 in flexure 42 so that the flexure and head gimble assembly as it moves horizontally relative to the disc and reaches the edge of the disc, is lifted above the disc unloading the head from the disc even in the absence of rotation of the disc.

The present invention may be embodied in other specific forms without departing from the spirit or essential characteristics of the present invention. The present embodiment is presented merely as illustrative and it is not intended that the invention be limited to the specific example described above and shown in the attached figures. It is believed that by using the combination of features described above, that a compact disc drive having dimensions of approximately 50 mm by 70 mm by 10 to 19 mm high can be achieved which can be driven with only a 5V DC power supply. A sufficient capacity of 10 megabytes or more data storage can be achieved on a 15 mm ID by 45 mm outside diameter by 0.020–0.025 inch thick disc, and reliable positioning of the head relative to the disc can be achieved. The remaining critical dimensions which can be achieved by the novel combination of design features described above is listed below.

pivot/gap=1.040
pivot/head=1.046
gap/head=0.028
pivot/center=1.082
# of TKS=700
RO=0.840
R last_TK=0.495
RPM=3000

The full scope of the present invention is to be limited only by the meaning and range of equivalency of the following claims.

What is claimed is:

1. A low-profile computer disc drive system for operating a compact hard disc, said disc drive system comprising:

at least one hard disc having concentric tracks;

a housing having opposed base and ceiling portions enclosing said hard disc;

means for rotatably supporting said hard disc;

means for rotating said hard disc at constant speed;

transducer means for writing digital information and reading digital information from said hard disc; and positioning means for moving said transducer means along a path in a substantially radial direction relative to said hard disc between the tracks on said hard disc, said positioning means including an actuator arm having first and second ends and a pivot positioned along said arm between said ends, said transducer means supported at said first end of said arm, and a voice coil motor forming a magnetic circuit and having a reduced thickness in which a single selectively energized coil is supported at said second end of said arm and movable upon activation of said voice coil between first and second magnets mounted respectively within the interior of said housing and on said base of said housing and on said ceiling of said housing, said base and ceiling of said housing completing said magnetic circuit for operation of said voice coil motor, so that the overall external thickness of said housing in a direction parallel to be said pivot in the region containing said voice coil motor is substantially the combined thicknesses of only said magnets, said coil, said housing ceiling, said housing base, and air gaps between said coil and said magnets:

said means for rotating said hard disc at constant speed comprises an in-hub spindle motor for supporting said disc on an outer rotating hub of said spindle motor, and Hall-less spindle-motor driving circuits to determine motor position and to drive said spindle motor in the desired direction.

2. The computer disc drive system in claim 1, wherein said positioning means further comprises a gimble supporting a flexure/slider assembly, said flexure/slider assembly supporting said transducer means; and further comprising an inclined landing ramp adjacent said rotatable hard disc for landing said flexure/slider assembly on said landing ramp as said assembly is moved toward an edge of said disc adjacent to said ramp thereby lifting said transducer from a surface of said disc.

3. The computer disc drive of claim 1, wherein said housing has external dimensions substantially 70 mm by 50 mm and a thickness substantially between 10 mm and 19 mm for slidable and interchangeable insertion into and removal from notebook computer peripheral slots.

4. A low-profile computer disc drive system for operating a compact hard disc, said disc drive system comprising:

at least one hard disc having concentric tracks;

a housing having opposed base and ceiling portions enclosing said hard disc;

means for rotatably supporting said hard disc;

means for rotating said hard disc at constant speed;

transducer means for writing digital information and reading digital information from said hard disc;

positioning means for moving said transducer means along a path in a substantially radial direction relative to said hard disc between the tracks on said hard disc, said positioning means including an actuator arm having first and second ends and a pivot positioned along said arm between said ends, said transducer means supported at said first end of said arm, and a voice coil motor forming a magnetic circuit and having a reduced thickness in which a single selectively energized coil is supported at said second end of said arm and movable upon activation of said voice coil between first and second magnets mounted respectively and on said base of said housing and on said ceiling of said housing, said base and ceiling of said housing completing said magnetic circuit for operation of said voice coil motor, so that the overall external thickness of said housing in a direction parallel to said pivot in the region containing said voice coil motor is substantially the combined thicknesses of only said magnets, said coil, said housing ceiling, said housing base, and air gaps between said coil and said magnets:

said means for rotating said hard disc at constant speed comprises an in-hub spindle motor for supporting said disc on an outer rotating hub of said spindle motor, and Hall-less spindle-motor driving circuits to determine motor position and to drive said spindle motor in the desired direction; and a first electrical connector which extends through said housing wall adjacent said voice coil motor, and a second electronic connector extending through said base of said housing, said connector on said upright sidewall adjacent said voice coil motor minimizing the distance from said transducer to said connector and thereby minimizing the attenuation of a transducer signal from said transducer to said computer, said first electrical connector facilitating mating insertion and withdrawal of said disc drive into or a computer in which the disc drive is to be used.

5. The computer disc drive system in claim 4, wherein said positioning means further comprises a gimble supporting a flexure/slider assembly, flexure/slider assembly supporting said transducer means; and further comprising an inclined landing ramp adjacent said rotatable hard disc for landing said flexure/slider assembly on said landing ramp as said assembly is moved toward an edge of said disc adjacent to said ramp thereby lifting said transducer from a surface of said disc.

6. The computer disc drive of claim 4, wherein said housing has external dimensions of substantially 70 mm by 50 mm and a thickness substantially between 10 mm and 19 mm for slidable and interchangeable insertion into said removal from notebook computer peripheral slots.

7. A computer disc drive system for operating a compact hard disc, said disc drive system comprising:
- a housing having a base member and an opposing roof member for enclosing said disc drive system;
- at least one hard disc having a plurality of concentric tracks;
- means for rotatably supporting said hard disc;
- means for rotating said hard disc at constant speed,
- transducer means for writing digital information and reading digital information from said hard disc;
- positioning means for moving said transducer means between the tracks on said hard disc, said positioning means including a voice coil motor forming a magnetic circuit and having a reduced thickness comprising a single magnet supported opposite a pivot across from said transducer means, and first and second voice coil components, said first voice coil component supported form said base of said housing and said second voice coil component supported from said roof of said housing, said single magnet being selectively positionable by activation of said first and second voice coil components, whereby the transducer means are selectively positionable over tracks on said disc, said base and roof of said housing completing said magnetic circuit for operation of said voice coil motor so that the overall external thickness of said housing in the region containing said voice coil motor is substantially the combined thickness of only said magnet, said first and second coil components, aid housing roof, said housing base, and air gaps between said coils and said magnet; and
- a first electrical connector which extends through said housing wall adjacent said voice coil motor, and a second electrical connector extending through said base of said housing, so that said disc drive may be mated to an external electrical connector via said second electrical connector and inserted into and withdrawn from a computer, including being electrically connected to said computer via said first connector in which the disc drive is to be used;
- said means for rotating said hard disc at constant speed comprises an in-hub spindle motor for supporting said disc on an outer rotating hub of said spindle motor, and Hall-less spindle-motor driving circuits to determine motor position and to drive said spindle motor in the desired direction.

8. The computer disc drive system in claim 7, wherein said positioning means further comprises a gimble supporting a flexure/slider assembly, said flexure/slider assembly supporting said transducer means; and further comprising an inclined landing ramp adjacent said rotatable hard disc for landing said flexure/slider assembly on said landing ramp as said assembly is moved toward an edge of said disc adjacent to said ramp thereby lifting said transducer from a surface of said disc.

9. The computer disc drive of claim 7, wherein said housing has external dimensions substantially 70 mm by 50 and a thickness substantially between 10 mm and 19 mm for slidable and interchangeable insertion into and removal from notebook computer peripheral slots.

10. A low-profile computer disc drive system for operating a compact hard disc, said disc drive system comprising:
- at least one hard disc having concentric tracks;
- a housing having a base and top portion wherein said top portion including a ceiling portion opposing said base portion and sidewalls mating with said base portion to define a cavity, said housing having external dimensions substantially 70 mm by 50 mm and a thickness substantially between 10 mm and 19 mm for slidable and interchangeable insertion into and removal from notebook computer peripheral slots;
- means for rotatably supporting said hard disc;
- means for rotating said hard disc at constant speed, including an in-hub spindle motor for supporting said disc on an outer rotting hub of said spindle motor, and Hall-less spindle-motor driving circuits to determine motor position and to drive said spindle motor in the desired direction;
- transducer means for writing digital information and reading digital information from said hard disc; and
- positioning means for moving said transducer means along a path in a substantially radial direction relative to a radius of said hard disc between the tracks on said hard disc,
- said positioning means including an actuator arm having first and second ends and a pivot positioned along said arm between said ends, and a voice coil motor forming a magnetic circuit and having a single selectively energized coil supported at said second end of said arm and movable upon activation of said voice coil between first and second magnets mounted respectively on said base of said housing and said ceiling of said housing, said base and ceiling of said housing completing said magnetic circuit for operation of said voice coil motor;
- said voice coil motor having a compact design having a reduced thickness in which said first and second magnets are mounted directly to the ceiling and base portions of said housing in which the said or each disc, supporting means, transducer means and positioning means are disposed, and are contained entirely within said housing, so that the overall external thickness of said housing in a direction parallel to said pivot in the region containing said voice coil motor is substantially the combined thicknesses of only said magnets, said coil, said housing ceiling, said housing base, and air gaps between said coils and said magnet;
- said positioning means further comprises a flexure supporting a gimble/slider assembly, said gimble/slider supporting said transducer means, and said transducer means supported at said first end of said arm on said longitudinal axis on said gimble mounted on one end of said flexure, said flexure being a straight arm loadbeam extending from an attachment point of said flexure to an attachment area said arm located between said pivot and said arm first end and having a shape in a plane parallel to said disc surface which is tapered about said longitudinal axis from a wide portion proximate said first end to a narrow portion proximate said transducer means; and
- an inclined landing ramp adjacent said rotatable hard disc for landing said flexure on said landing ramp as said flexure is moved toward an edge of said disc adjacent to said ramp thereby lifting said transducer from a surface of said discs;
- said housing cavity enclosing said at least one hard disc, said means for rotatably supporting said hard disc, said means for rotating said hard disc, said transducer means, and said positioning means; the overall dimensions of said housing being substantially 70 mm by substantially 50 mm with a thickness of substantially between 10 mm, said transducer means being selectively positionable over tracks on said disc.

11. The computer disc drive system of claim 10, wherein said flexure is substantially 18 mm long.

12. The computer disc drive system in claim 10, wherein said hard disc has substantially a 45 mm diameter, and said suspension includes an 18 mm long suspension arm.

13. A low-profile computer disc drive system for operating a compact hard disc, said disc drive system comprising:

at least one hard disc having concentric tracks;

a housing having opposed base and ceiling portions enclosing said hard disc;

means for rotatably supporting said hard disc;

means for rotating said hard disc at constant speed;

transducer means for writing digital information and reading digital information from said hard disc; and positioning means for moving said transducer means along a path in a substantially radial direction relative to a radius of said hard disc between the tracks on said hard disc, said positioning means including an actuator arm having first and second ends and a pivot positioned along said arm between said ends, said transducer means supported at said first end of said arm, and a voice coil motor forming a magnetic circuit and having a single selectively energized coil supported at said second end of said arm and movable upon activation of said voice coil between first and second magnets mounted respectively on said base of said housing and said ceiling of said housing, said base and ceiling of said housing completing said magnetic circuit for operation of said voice coil motor, whereby the transducer means are selectively positionable over tracks on said disc;

a first electrical connector which extends through said housing wall adjacent said voice coil motor, and a second electronic connector extending through said base of said housing, said connector on aid upright sidewall adjacent said voice coil motor minimizing the distance from said transducer to said connector and thereby minimizing the attenuation of a transducer signal from said transducer to said computer, said first electrical connector facilitating mating insertion and withdrawal of said disc drive into or a computer in which the disc drive is to be used;

said means for rotating said hard disc at constant speed comprises an in-hub spindle motor for supporting said disc on an outer rotating hub of said spindle motor, and Hall-less spindle-motor driving circuits to determine motor position and to drive said spindle motor in the desired direction;

said positioning means further comprises a gimble supporting a flexure/slider assembly, said flexure/slider supporting said transducer; and further comprising an inclined landing ramp adjacent said rotatable hard disc for landing said flexure/slider assembly on said landing ramp as said assembly is moved toward an edge of said disc adjacent to said ramp thereby lifting said transducer for a surface of said disc, said housing has external dimensions of substantially 70 mm by 50 mm and a thickness substantially between 10 mm and 19 mm for slidable and interchangeable insertion into and removal from notebook computer peripheral slots; and said positioning means further comprises a suspension arm having substantially an 18 mm long flexure, said slider supporting said transducer; and an inclined landing ramp adjacent said rotatable hard disc for landing said flexure on said landing ramp as said flexure is moved toward an edge of said disc adjacent to said ramp thereby lifting said transducer from a surface of said disc.

14. A computer disc drive system for operating a compact hard disc, said disc drive system comprising:

a housing having a base member and an opposing roof member for enclosing said disc drive system;

at least one hard disc having a plurality of concentric tracks;

mean for rotatably supporting said hard disc;

means for rotating said hard disc at constant speed, transducer means for writing digital information and reading digital information from said hard disc;

positioning means for moving said transducer means between the tracks on said hard disc, said positioning means including a voice coil motor comprising a single magnet supported opposite a pivot across from said transducer means, and a voice coil motor having first and second voice coil components, said first voice coil components supported form said base of said housing and said second voice coil component supported form said roof of said housing, said single magnet being selectively positionable by activation of said voice coil, whereby the transducer means are selectively positionable over tracks on said disc;

a first electrical connector which extends through said housing wall adjacent said voice coil motor, and a second electronic connector extending through said base of said housing, so that said disc drive may be mated to an external connector via said second electronic connector and inserted into and withdrawn from a computer, including being electrically connected to said computer via said first connector, in which the disc drive is to be used;

said means for rotating said hard disc at constant speed comprises an in-hub spindle motor for supporting said disc on an outer rotating hub of said spindle motor, and Hall-less spindle-motor driving circuits to determine motor position and to drive said spindle motor in the desired direction;

said positioning means further comprises a gimble supporting a flexure/slider assembly, said flexure/slider supporting said transducer; and further comprising an inclined landing ramp adjacent said rotatable hard disc for landing said flexure/slider assembly on said landing ramp as said assembly is moved toward an edge of said disc adjacent to said ramp thereby lifting said transducer from a surface of said disc; and said housing has external dimensions substantially 70 mm by 50 mm and a thickness substantially between 10 mm and 19 mm for slidable and interchangeable insertion into and removal from notebook computer peripheral slots.

15. The computer disc drive system in claim 14, wherein said said positioning means further comprises a suspension arm having substantially an 18 mm long flexure.

16. A low-profile computer disc drive system for operating a compact hard disc, said disc drive system comprising:

at least one hard disc having concentric tracks;

a housing having opposed base and ceiling portions enclosing said hard disc;

means for rotatably supporting said hard disc;

means for rotating said hard disc at constant speed;

transducer means for writing digital information and reading digital information from said hard disc; and positioning means for moving said transducer means along a path in a substantially radial direction relative to said hard disc between the tracks on said hard disc, said positioning means including an actuator arm having first and second ends and a pivot positioned along said arm between said ends, said transducer means supported at said first end of said arm, and a voice coil motor forming a magnetic circuit and having a reduced thickness in which a single selectively energized coil is supported at said second end of said arm and movable upon activation of said voice coil between first and second magnets mounted respectively and on said base of said housing and on said ceiling of said housing, said base and ceiling of said housing completing said magnetic circuit for operation of said voice coil motor, so that the overall external thickness of said housing in a direction parallel to said pivot in the region containing said voice coil motor is substantially the combined thicknesses of only said magnets, said coil, said housing ceiling, said housing base, and air gaps between said coil and said magnets; and said means for rotating said hard disc at constant speed comprises an in-hub spindle motor for supporting said disc on an outer rotating hub of said spindle motor, and Hall-less spindle-motor driving circuits to determine motor position and to drive said spindle motor in the desired direction.

* * * * *